T. FAIRCHILD & C. HAZELTINE.
Door-Bolt.
No. 213,182. Patented Mar. 11, 1879.
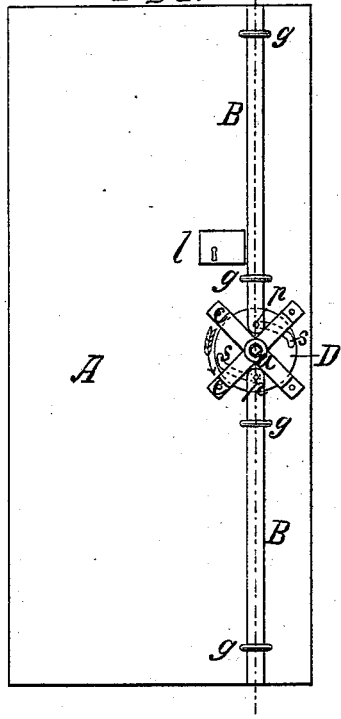
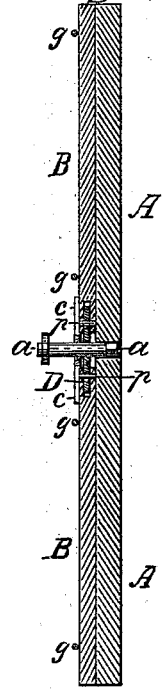
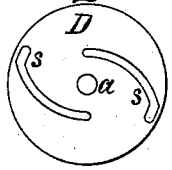
Witnesses:
Carroll C. Beebe.
A. G. Little
Inventors:
Truman Fairchild,
Channing Hazeltine.
per
Wiswell & Gilman,
Attorneys.

UNITED STATES PATENT OFFICE.

TRUMAN FAIRCHILD AND CHANNING HAZELTINE, OF DERBY, VERMONT.

IMPROVEMENT IN DOOR-BOLTS.

Specification forming part of Letters Patent No. 213,182, dated March 11, 1879; application filed November 11, 1878.

*To all whom it may concern:*

Be it known that we, TRUMAN FAIRCHILD and CHANNING HAZELTINE, both of Derby, in the county of Orleans and State of Vermont, have invented certain new and useful Improvements in Combined Door Fastener and Lock; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention consists of bolts or bars bifurcated at their adjacent ends, so as to inclose a portion of the slotted disk, the bolts moving in guides, and having pins which operate in slots formed in a disk mounted on a short axle, and operated by means of a key or knob, and a cross-piece, all as hereinafter more fully described and claimed.

Figure 1 represents an elevation of a door having our improvement thereon. Fig. 2 is a vertical section of the same, the plane of section being indicated by the line $y\ y$, Fig. 1. Fig. 3 is an enlarged detail view of the slotted disk D.

A is the door; B B, the bolts, and D the slotted disk.

The bolts B B are bifurcated at the adjacent ends of each. These bifurcations inclose a portion of the slotted disk D. Pins $p\ p$ pass through these ends, and also through the slots $s\ s$, which are cam-shaped, as shown in Fig. 1.

By turning the disk in the direction of the arrow, the bolts B B will be projected outwardly, a reverse motion of said disk withdrawing said bolts to their original position. Guides $g\ g$ guide the bolts B B, as shown in Fig. 1.

The slotted disk D is secured to the axle $a$. Said axle may be shaped to fit a key, or it may be squared to receive the socket of a knob. A hole in the door serves for one bearing of axle $a$, and a similar hole in the cross-piece $c$ serves for the other bearing.

If desired, a third slot, similar to those $s\ s$, may be made in the disk D, to operate a third (horizontal) bolt, similar to those, B B, hereinbefore described.

A lock, $l$, may be placed to engage with one of the bolts B B, or at a point to engage with a notch in the periphery of the disk D.

Having thus described our invention, we claim as new and desire to secure by Letters Patent—

The bolts B B, moving in guides $g\ g$, and notched at their rear ends, to embrace disk B, to which they are connected by pins $p\ p$, operating in slots $s\ s$, in combination with axle $a$ and cross-piece $e$, substantially as described.

In testimony that we claim the foregoing as our own we affix our signatures in presence of two witnesses.

TRUMAN FAIRCHILD.
CHANNING HAZELTINE.

Witnesses:
F. A. WISWELL,
W. H. GILMAN.